United States Patent [19]

Rice et al.

[11] Patent Number: 5,519,735
[45] Date of Patent: May 21, 1996

[54] RECONSTRUCTING A PRIMARY SIGNAL FROM MANY SECONDARY SIGNALS

[75] Inventors: Bart F. Rice, Santa Cruz; Michael E. Wilhoyte, San Jose, both of Calif.

[73] Assignee: Lockheed Missiles & Space Co., Inc., Sunnyvale, Calif.

[21] Appl. No.: 234,231

[22] Filed: Apr. 28, 1994

[51] Int. Cl.$^6$ ................................. H04B 7/12; H04L 1/02
[52] U.S. Cl. .......................... 375/347; 375/350; 375/232; 455/137
[58] Field of Search ................................ 375/100, 40, 11, 375/12, 14, 15, 260, 261, 229, 232, 233, 230, 347, 350, 349, 316, 230, 235; 455/132, 136, 137, 138, 139

[56] References Cited

U.S. PATENT DOCUMENTS

| | | | |
|---|---|---|---|
| 3,879,664 | 4/1975 | Monsen | 375/100 |
| 4,079,318 | 3/1978 | Kinoshita | 455/139 |
| 4,271,525 | 6/1981 | Watanabe | 375/100 |
| 4,328,585 | 5/1982 | Monsen | 375/14 |
| 4,733,402 | 3/1988 | Monsen | 375/100 |
| 5,027,371 | 6/1991 | Sehier et al. | 375/15 |
| 5,265,122 | 11/1993 | Rasky et al. | 375/100 |

OTHER PUBLICATIONS

Crochiere, R. E. & Rabiner, L. R., "Multirate Signal Processing" Prentice Hall, 1983, Section 7.7.

Friedlander, B., "Lattice Filters for Adaptive Processing," Proceedings of the IEEE, vol. 70, No. 8, Aug. 1982, pp. 829–867.

Godard, D., "Self-Recovering Equalization and Carrier Tracking in Two-Dimensional Data Communication Systems," IEEE Transactions on Communications, vol. com-28, No. 11, Nov. 1980, pp. 1867–1875.

Gooch, R., et al., "A Lattice-Based Constant Modulus Adaptive Filter," IEEE 1987.

Makhoul, J., "A Class of All-Zero Lattice Digital Filters: Properties and Applications," IEEE Transactions on Acoustics, Speech & Signal Processing, vol. ASSP-26, No. 4, Aug. 1978, pp. 304–314.

(List continued on next page.)

*Primary Examiner*—Stephen Chin
*Assistant Examiner*—Tesfaldet Bocure
*Attorney, Agent, or Firm*—Phong K. Truong; Edward J. Radlo

[57] ABSTRACT

An original signal, different portions of which are captured by two or more different receivers, is reconstructed from the outputs of the various receivers. In a first embodiment, signal reconstruction is achieved by first converting the analog receiver outputs into digital signals and then shifting the frequency of at least one of the digital signals such that a frequency difference is introduced between at least two of the digital signals. Thereafter, each digital signal is processed through a corresponding filter (38, 40) to derive filtered signals. These filtered signals are combined to derive a primary output signal which is a representation of the original signal. After the primary output signal is derived, it is passed on to an error determiner (44) where an error component is computed. This error component is used to adjust the parameters of the filters (38, 40) in such a manner as to reduce the error component. In an alternative method, the original signal is reconstructed by first processing all but one of the digital signals through a corresponding (114) filter to derive one or more filtered signals. The filtered signal or signals are combined with the digital signal which was not filtered to derive an intermediate output signal. The intermediate output signal is processed through another filter (120) to derive a primary output signal representative of the original signal. As with the first method, the primary output signal is sent to an error determiner (126) where an error component is computed. This error component is used to adjust the parameters of all of the filters (114, 120) to reduce the error component. The present invention provides a robust solution for reconstructing multichannel signals which is capable of tolerating variable frequency overlaps, relative time delays between signals on the multiple channels, and some degree of frequency offset.

16 Claims, 11 Drawing Sheets

OTHER PUBLICATIONS

Treichler, J. & Agee, B., "A New Approach to Multipath Correction of Constant Modulus Signals," IEEE Transactions on Acoustics, Speech & Signal Processing, vol. ASSP–31, No. 2, Apr. 1983, pp. 459–471.

Treichler, J. & Larimore, M. G., "New Processing Techniques Based on the Constant Modulus Algorithm," IEEE Transactions on Acoustics, Speech & Signal Processing, vol. ASSP–33, No. 2, Apr. 1985, pp. 420–431.

Satorius, E. H. & Alexander, S. T., "Channel Equalization Using Adaptive Lattice Algorithms," IEEE Transactions on Communications, vol. Com–27(6), pp. 899–905, Jun. 1979.

Widrow, B. & Stearns, S. "Adaptive Signal Processing" Prentice Hall, 1985, Chapters 13–14.

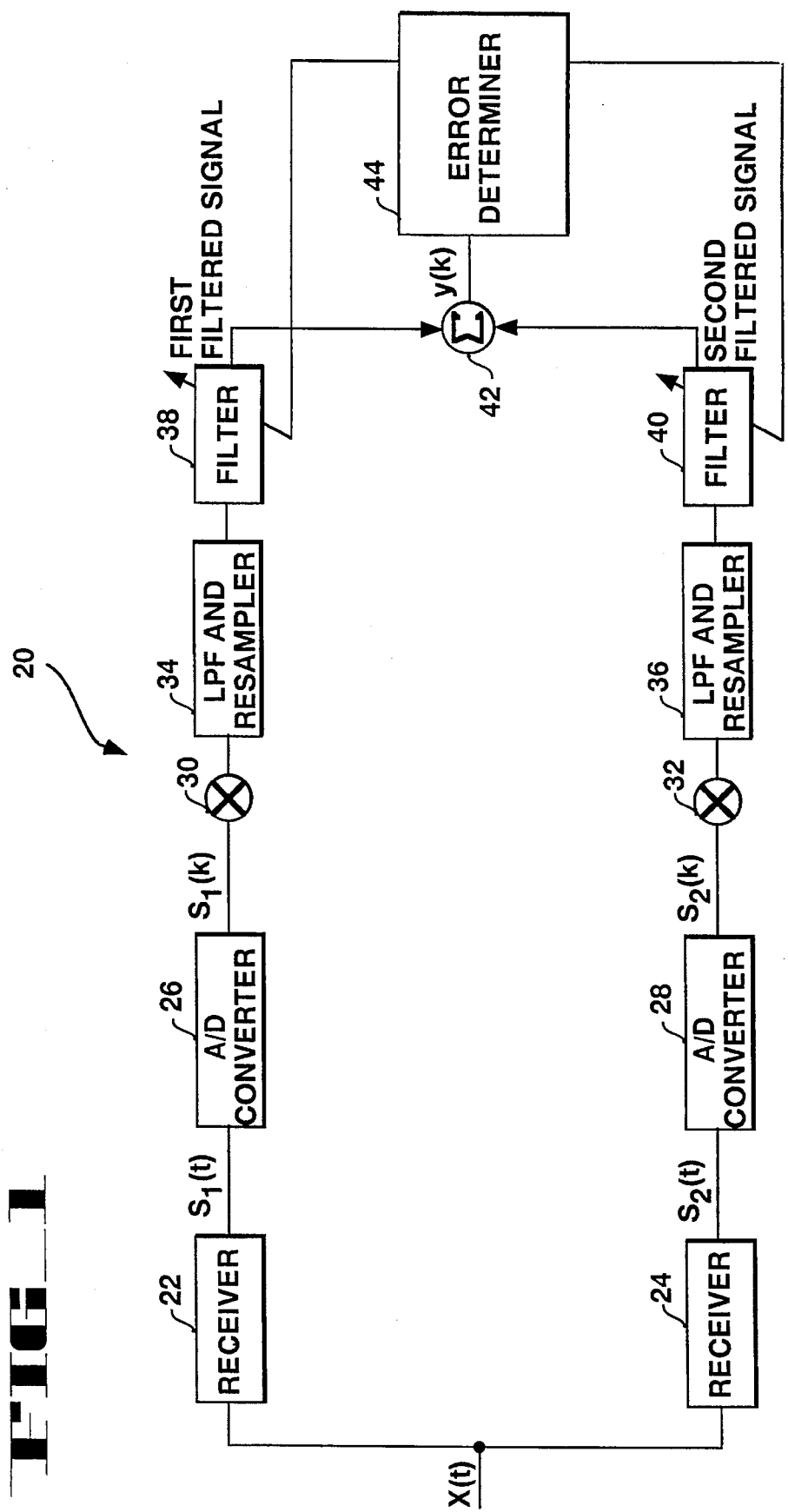

FIG_2A
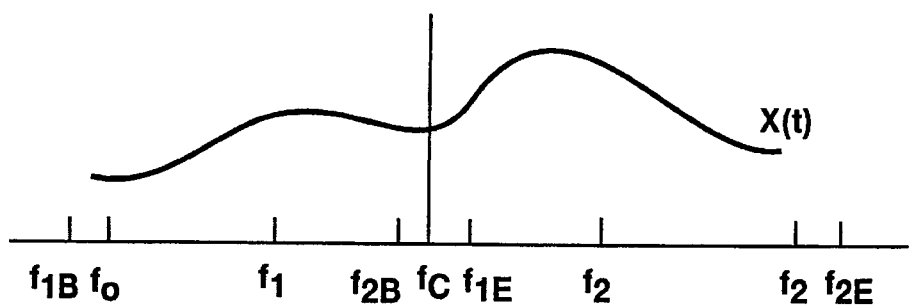
FIG_2B
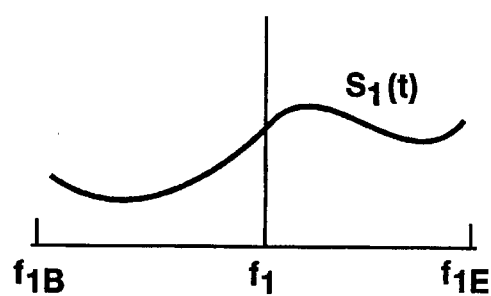
FIG_2C
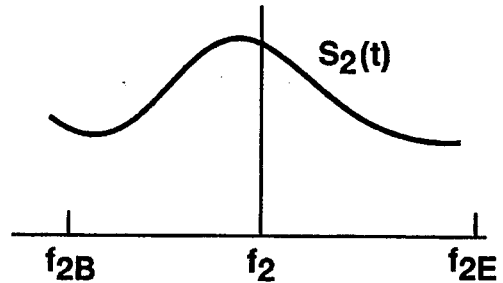
FIG_3
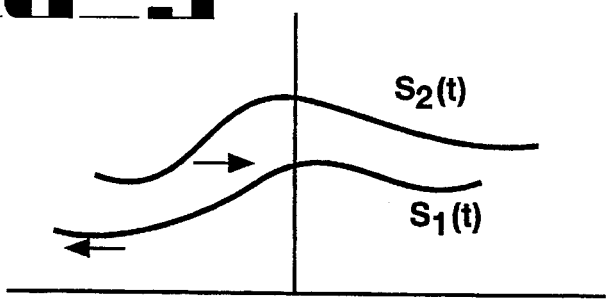

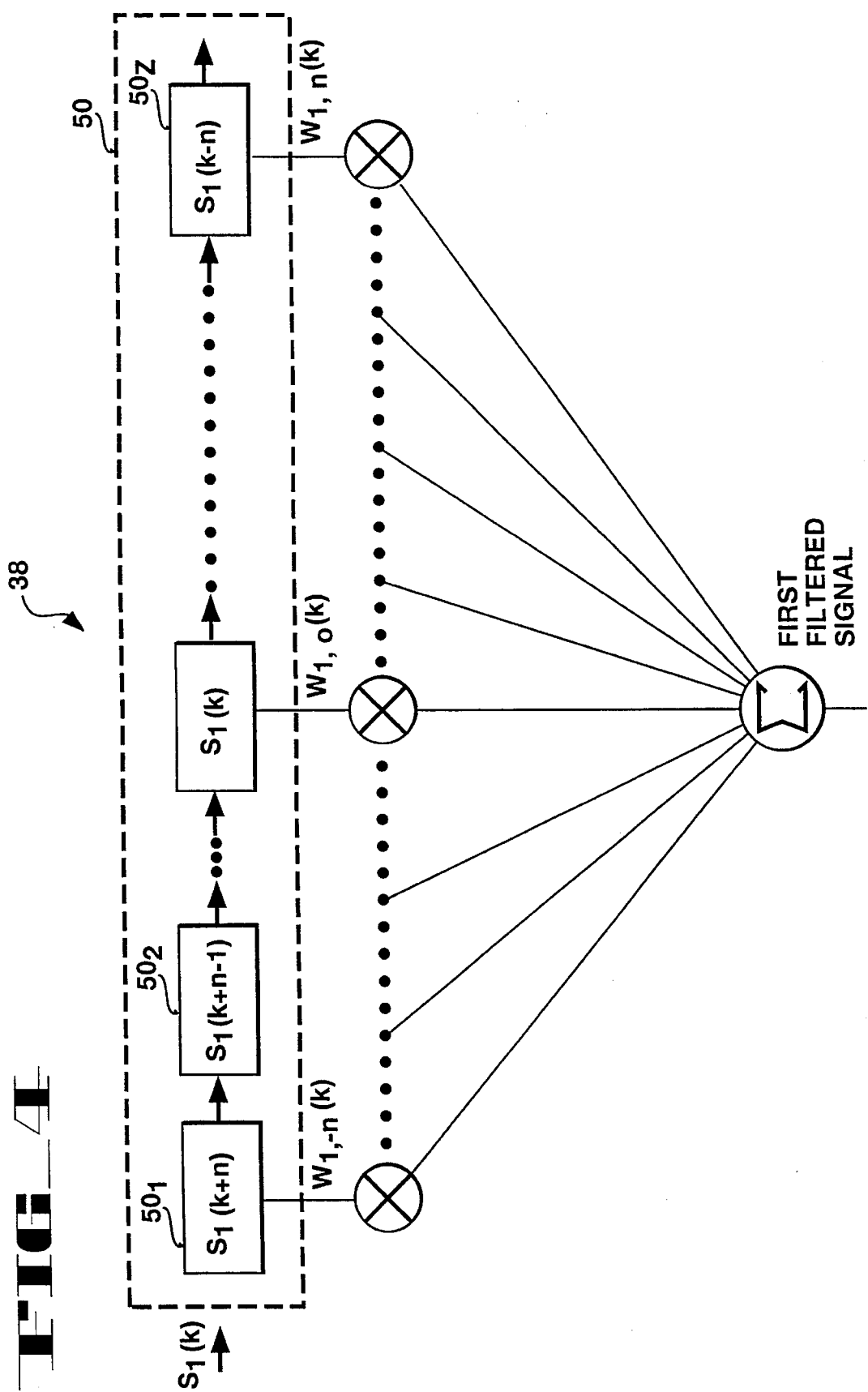

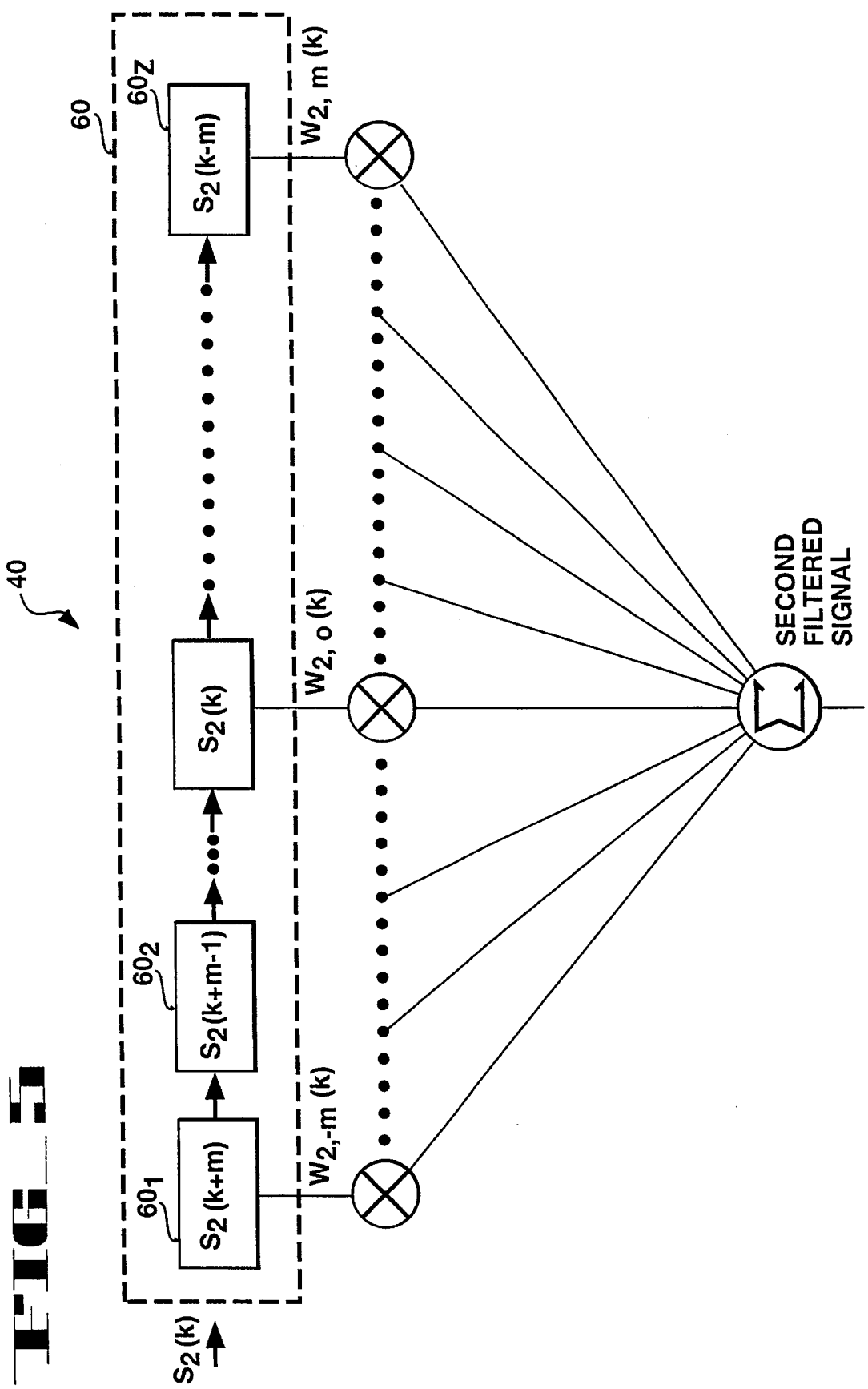

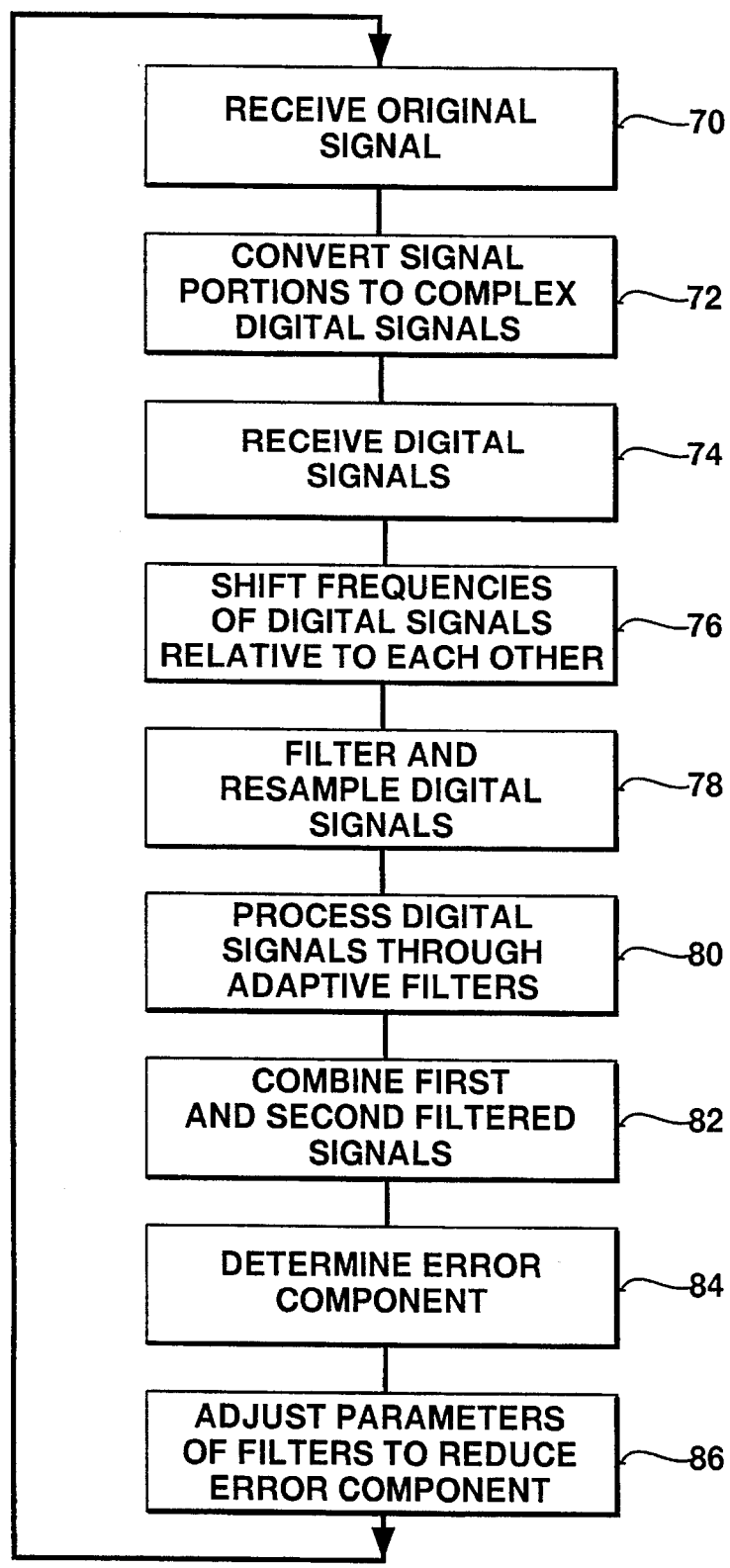
FIG_6

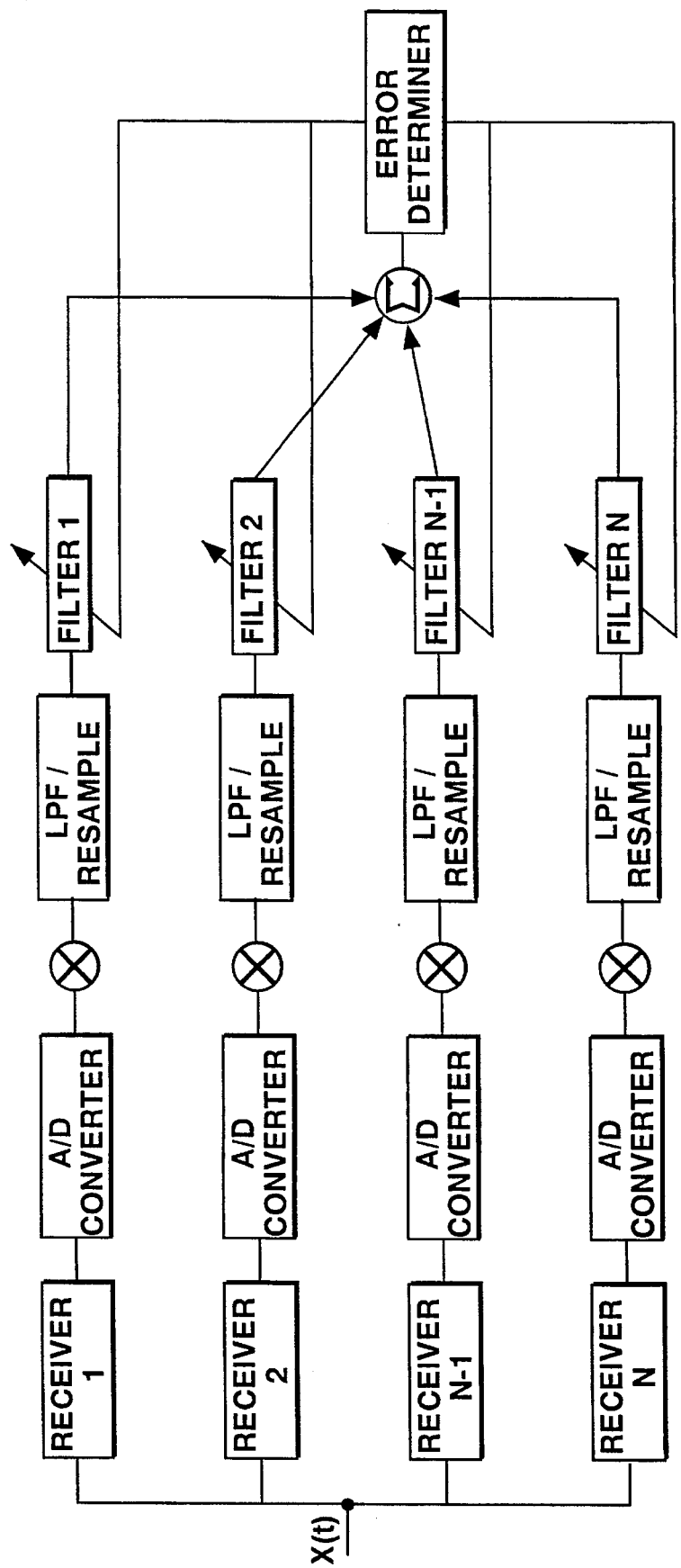
FIG_7

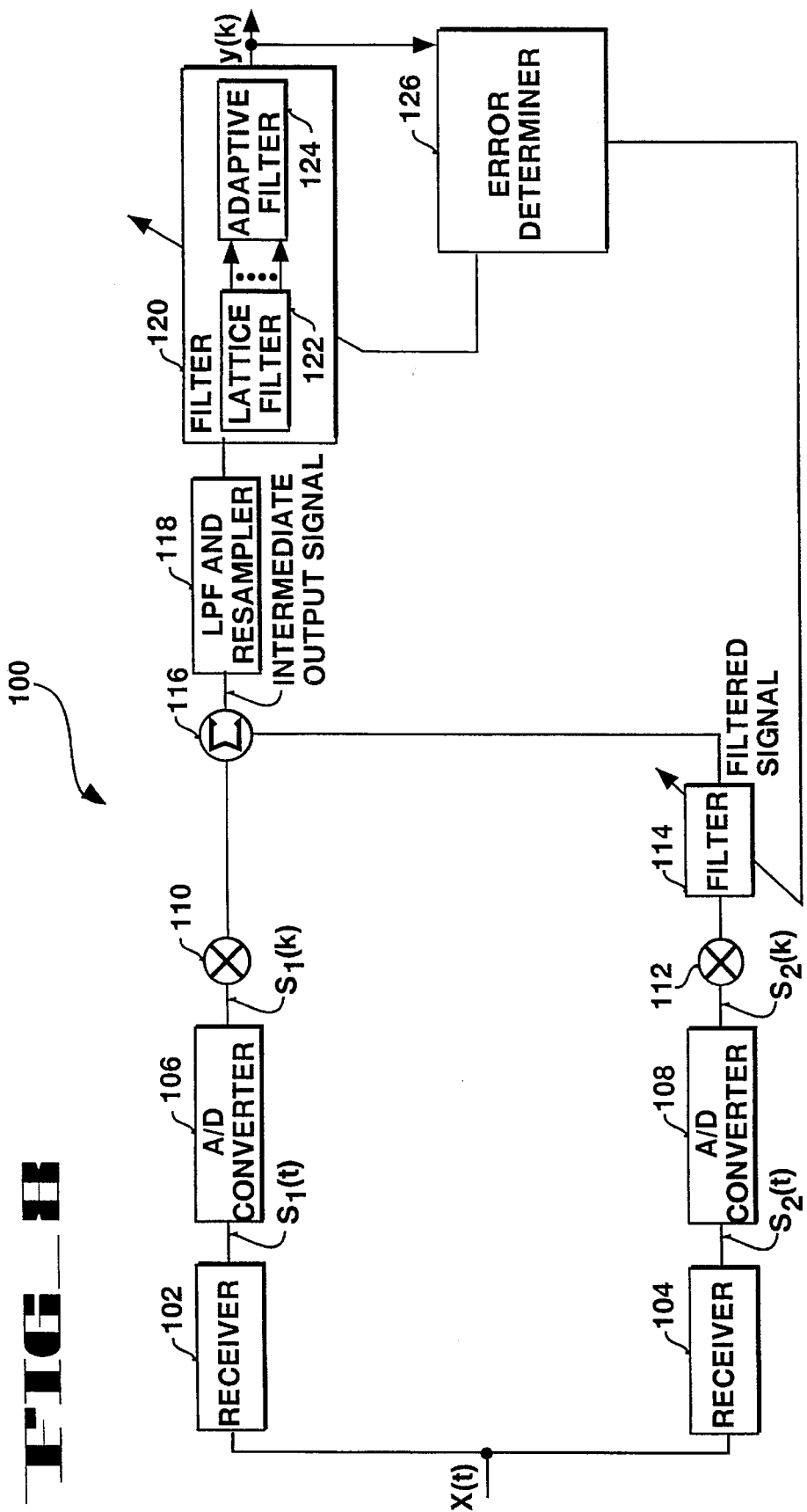

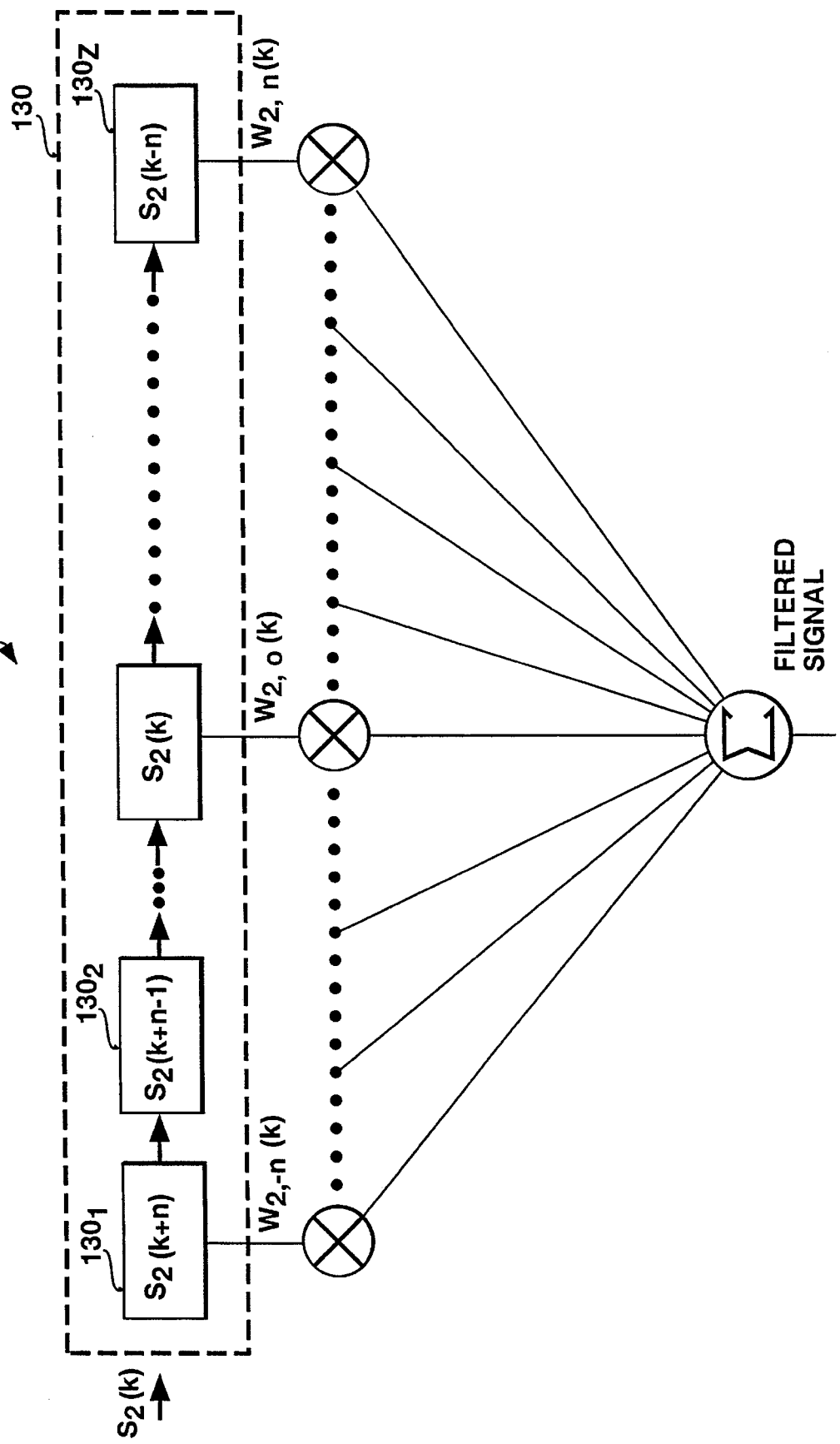
FIG_9

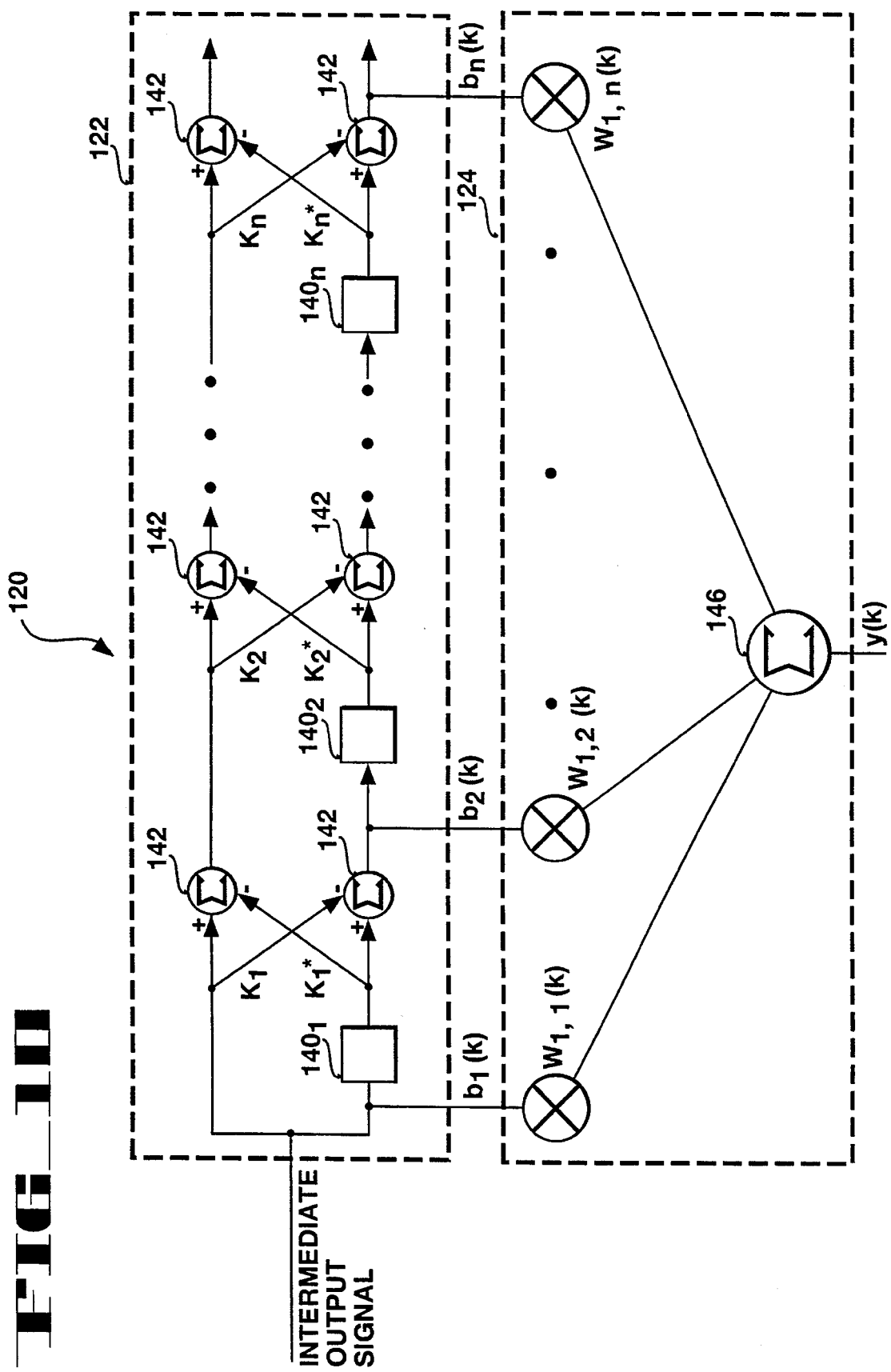
FIG._11

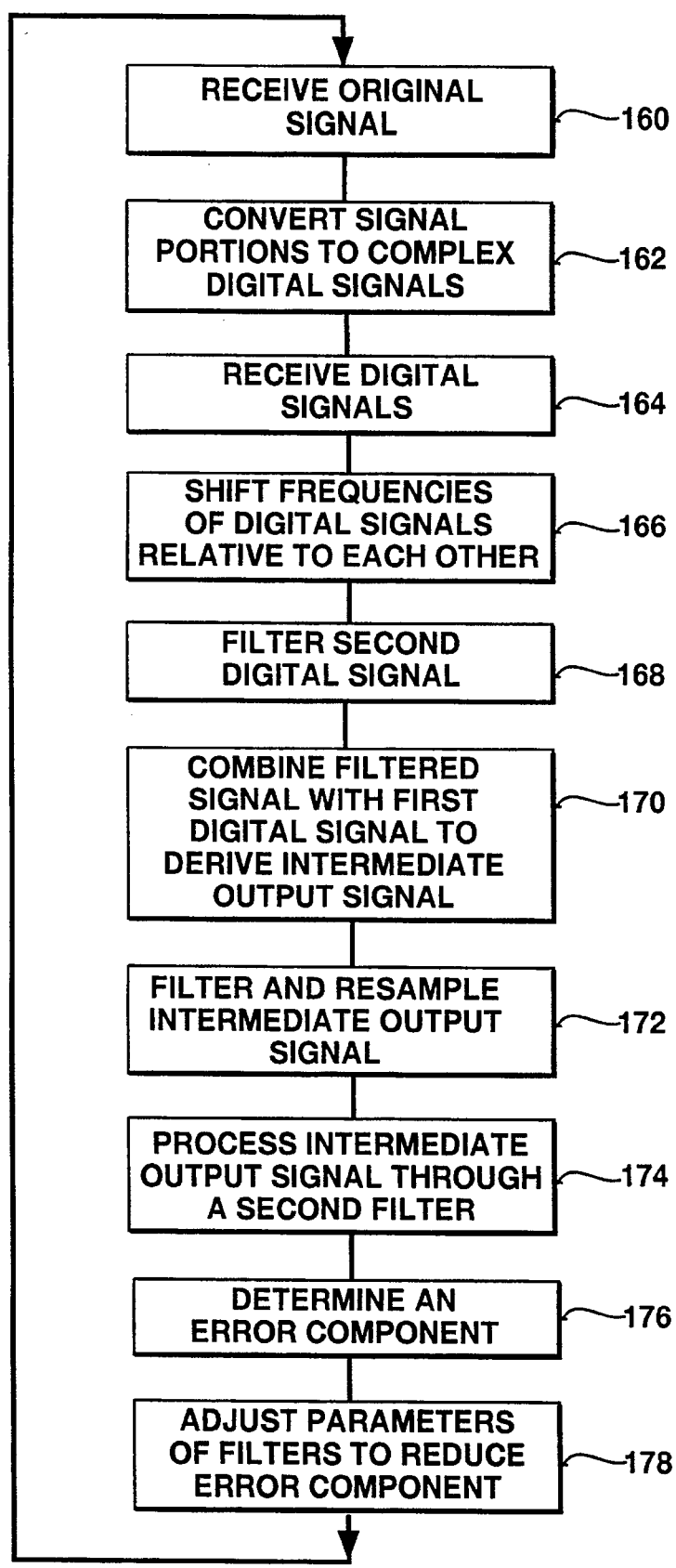
FIG_11

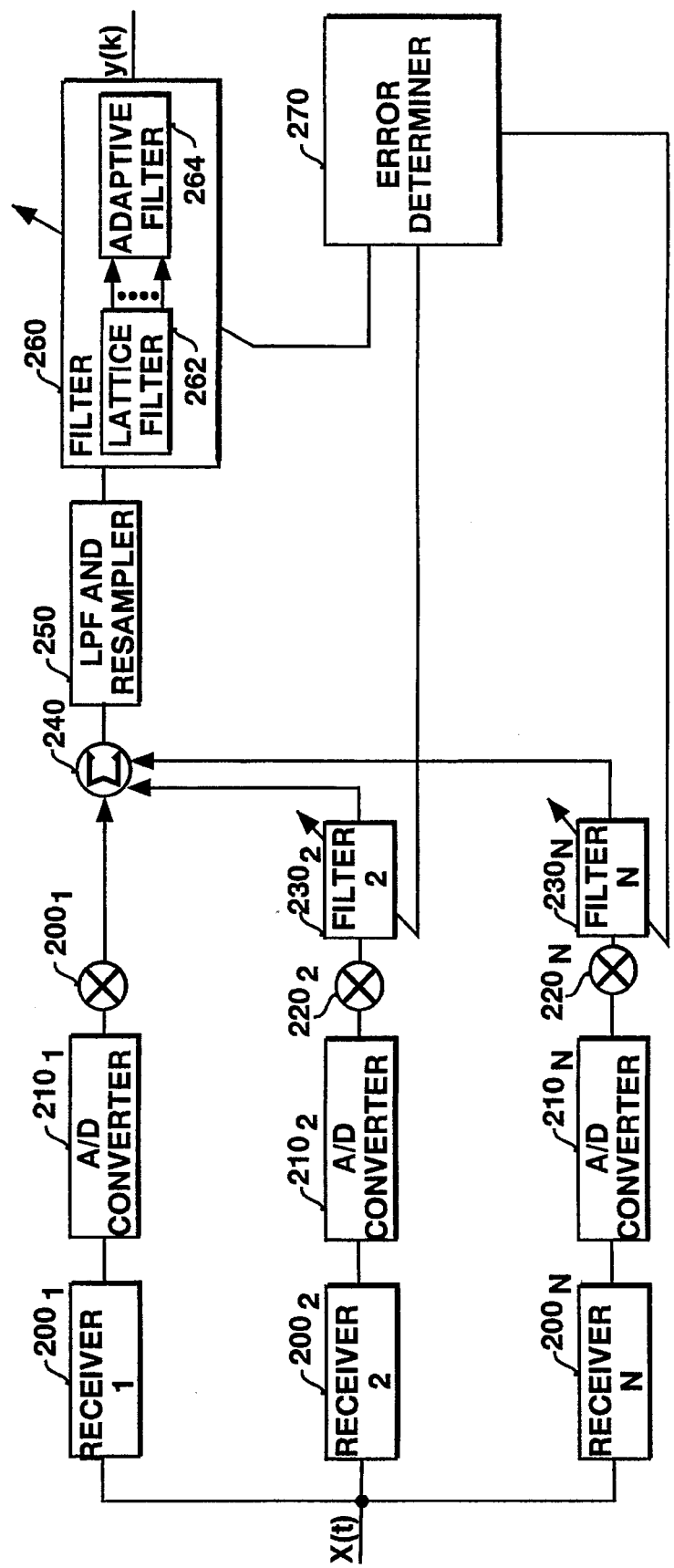

RECONSTRUCTING A PRIMARY SIGNAL FROM MANY SECONDARY SIGNALS

FIELD OF THE INVENTION

This invention relates generally to signal processing and more particularly to a system and method for reconstructing signals received on multiple channels.

BACKGROUND OF THE INVENTION

In the signal processing arena, it is generally accepted that the airways is not a perfect medium. Thus, it is usually taken for granted that when a signal is sent from a source node to a destination node, some noise and distortion will be injected into the source signal. Because noise and distortion are almost invariably introduced, a primary goal of signal processing is to compensate for, or to offset, the noise and distortion so that an exact replica (or a reasonably close replica) of the source signal can be reconstructed. To accomplish this goal, filters and equalizers are often implemented at the destination node. It is often the case that the distortion caused by a communications channel is not constant but rather varies over time. To compensate for this varying distortion, adaptive filters are typically used. In adaptive filters, the tap weights or coefficients of the filter are continuously updated to compensate for the varying amounts of distortion. Several types of adaptive filters are currently known in the art, including transversal adaptive filters. The adaptive filters currently known are effective when applied in situations where all portions of a signal are captured by a single receiver.

While in many applications, a signal can be captured and processed by a single receiver, there are applications in which a signal is only partially captured by each of a plurality of receivers. All of the receivers combined capture the entire signal but each individual receiver receives only a portion of the signal. An example of such a situation is one in which a source signal has a bandwidth of 40 MHz and the signal is captured (with some frequency overlap) by two receivers, each receiver having a receiving bandwidth of 22 MHz to capture approximately one half of the signal. The multichannel processing of wide band signals involves different techniques and considerations than for single-channel processing of signals.

Currently, two well known techniques are used for multichannel processing. The first technique involves the use of a multichannel adaptive filter. In this technique, different portions of the source signal are received by different receivers and the outputs of these receivers are summed to provide a reconstructed signal. This reconstructed signal is then passed through an adaptive filter to remove at least some of the distortion imposed by the various receivers or channels. The signal at the output of the filter is compared to a reference signal to derive an error component, and using this error component, the tap weights in the adaptive filter are modified so as to reduce the error component. This technique is adequate for some applications, but it has a significant drawback in that it is not robust. If the outputs of the various receivers are somehow time-delayed with respect to each other (as they may be if the receivers are separated from each other by a large distance), or if any of the receiver outputs are offset in frequency even by a small amount, this method cannot reconstruct a reasonable replica of the original source signal. Because this technique is relatively intolerant to equipment and implementation variations, its utility is limited.

An alternative technique for processing multichannel signals involves the use of quadrature mirror filters. According to this technique, the outputs of the various receivers are carefully filtered using quadrature mirror filters, thereby ensuring that the signal component from each receiver may be upsampled and added to the other to reconstruct the original signal. The filters are not adaptive. Such a technique is described in Crochiere and Rabiner, *Multirate Signal Processing*, Prentice-Hall, 1983. This technique has the same drawbacks as the one discussed above. Specifically, if the outputs of the receivers are time delayed with respect to one another in an unpredictable or variable manner, or if the outputs of the receivers have experienced an unknown offset in frequency, this technique cannot successfully reconstruct the original signal.

As discussed above, the techniques currently used for processing multichannel signals do not provide satisfactory results. A more robust method and system capable of tolerating variable and larger time delays, frequency offsets, and variable frequency overlaps is needed.

SUMMARY OF THE INVENTION

In accordance with the present invention, a robust signal processing method is provided wherein multiple adaptive filters are used for processing signals received on multiple channels. In accordance with a first embodiment of the invention, an original signal is received by at least two receivers (22, 24), each receiver capturing a portion of the original signal in a certain frequency range. Preferably, the two receivers (22, 24) together capture the entire bandwidth of the original signal. Once captured by the receivers, the different portions of the original signal are each sampled to provide digital versions of the original signal portions. These digital signal portions are then preferably processed by first shifting one of the digital signal portions in frequency with respect to the other. This step ensures that the digital signal portions are properly overlaid in frequency relative to each other such that an accurate representation of the original signal can be formed. Then, each of the digital signal portions is preferably processed through a corresponding digital filter (38, 40) to prepare the individual signal portions for combination. It is this step which compensates for the distortion introduced into the signal portions. Once the signal portions have been filtered, they are combined to produce a primary output signal representative of the original signal. The original signal is thus reconstructed. Thereafter, the primary output signal is preferably passed on to an error determiner (44), wherein an error component is computed. This error component is used to adjust the parameters of each of the digital filters (38, 40) in such a way as to reduce the error component. Thus, the filters (38, 40) are continually adapted to compensate for varying conditions. Reconstructing the original signal in accordance with the method of the present invention makes it possible to tolerate time delays between the various signal portions and to tolerate varying amounts of frequency overlap between the various receivers (22, 24).

In an alternative embodiment of the present invention, an original signal is received, sampled, and frequency shifted as described above. Thereafter, one of the two digital signal portions is processed through a first filter (114) to derive a filtered signal. This filtered signal is combined with the digital signal portion which was not filtered to derive an intermediate output signal. This intermediate output signal is then processed through a second filter (120) to derive a primary output signal which is representative of the original signal. Preferably, the second filter includes a lattice filter (122) for providing a plurality of parallel "orthogonal" outputs. The use of a lattice filter (122) accelerates data convergence so that the original signal may be reconstructed in a relatively short period of time. After the primary output signal is derived, it is passed on to an error determiner (126). The error determiner (126) computes an error component associated with the primary output signal and passes the error component on to the filters (114, 120) where the parameters of the filters (114, 120) are adjusted to reduce the error component. Thus, as with the first embodiment of the invention, the parameters of the filters (114, 120) are continually adjusted to compensate for varying conditions.

The results provided by both embodiments of the present invention are comparable. Unlike the prior art methods, both embodiments of the present invention are capable of tolerating time delays and variable frequency overlaps between the various signal portions. Because the second embodiment utilizes a lattice filter, which provides for faster data convergence, the second embodiment can track more rapid changes in channel conditions. Also, the second embodiment can reconstruct the source signal even if there is a frequency offset (up to about 0.01% of the baud rate) between the signal portions. Thus, the second embodiment is more versatile. However, the implementation of the second embodiment is more complex. Hence, which embodiment is used for a particular application depends on the requirements of the application.

BRIEF DESCRIPTION OF THE DRAWINGS

FIG. 1 is a functional block diagram representation of a first preferred embodiment of the present invention.

FIGS. 2a–2c are frequency plots of the original signal $X(t)$, the signal portion $S_1(t)$ captured by receiver 22, and the signal portion $S_2(t)$ captured by receiver 24, respectively.

FIG. 3 is a frequency plot of the result obtained by summing the signal portions $S_1(t)$ and $S_2(t)$ without first shifting the signal portions in frequency relative to each other.

FIG. 4 is a functional block diagram representation of the filter 38 of FIG. 1.

FIG. 5 is a functional block diagram representation of the filter 40 of FIG. 1.

FIG. 6 is an operational flow diagram for the system 20 of FIG. 1.

FIG. 7 is a generalization of the system 20 of FIG. 1 wherein the source signal $X(t)$ is received by an arbitrary number N of receivers.

FIG. 8 is a functional block diagram representation of a second preferred embodiment of the present invention.

FIG. 9 is a functional block diagram representation of the filter 114 of FIG. 8.

FIG. 10 is a functional block diagram representation of the filter 120 of FIG. 8 showing the lattice filter 122 and the adaptive filter 124 coupled thereto.

FIG. 11 is an operational flow diagram for the system 100 of FIG. 8.

FIG. 12 is a generalization of the system 100 of FIG. 8 wherein the source signal $X(t)$ is received by an arbitrary number N of receivers.

DETAILED DESCRIPTION OF THE PREFERRED EMBODIMENTS

Broad band signals are frequently used in multichannel telecommunications. In applications where broad band signals are used, it is usually desirable to capture the entire signal on a single channel using a single receiver, and to process the signal as one complete signal. However, depending on the circumstances, this may not be possible or desirable. For example, the cost of a receiver capable of receiving the entire signal may be too costly for a certain application, or it may be the case that a user wishes to use lower bandwidth receivers that he already possesses rather than investing in a new and great broader bandwidth receiver. Whatever the reason, there are a number of applications in which it is desirable or necessary to capture a source signal on multiple channels using multiple receivers. If a signal is captured in multiple channels, the signals in the various channels will be referred to as sub-bands of the original signal.

There are certain factors which affect whether a multichannel signal can be successfully reconstructed from multiple sub-bands of the signal. The first factor is frequency overlap between the receivers. It is usually the case that when two or more receivers are used to collect the full bandwidth of a signal, the combined frequency ranges of the receivers will be greater than the bandwidth of the signal. Thus, there will be some frequency overlap between the receivers. This overlap can have an affect on the reconstructability of the original signal. Another factor is that of possible time delay between the signal portions received by the receivers. A relative time delay may arise for a number of reasons. For example, if the receivers are placed relatively far apart, the source signal may arrive at one receiver before the other. This will impose a relative time delay between the signal portions received by the different receivers. Other mechanisms can also produce delays. An effective signal reconstruction mechanism should be able to tolerate this time delay and to compensate therefor. Yet another factor is that of possible frequency offset. As will be explained in a subsequent section, it is important in reconstructing the source signal to ensure that the frequency bands of the receiver outputs are properly overlaid relative to each other so that no frequency offset results. Significant frequency offsets can hinder and even preclude the successful reconstruction of a signal. While it is known that frequency offsets are undesirable, it is not always possible to prevent them due to certain phenomena such as Doppler effects. Since frequency offsets sometimes cannot be prevented, an effective reconstruction mechanism preferably has the ability to tolerate at least some degree of offset.

The present invention provides a mechanism for reconstructing multichannel signals which can tolerate variable frequency overlaps, relative time delays, and some degree of frequency offset. With reference to FIG. 1, there is shown a block diagram representation of a first preferred embodiment 20 of the present invention, wherein an original signal $X(t)$ is shown as being received by two separate receivers 22, 24. Receiver 22 is preferably tuned to a frequency $f_1$ to capture a portion of signal $X(t)$ in a selected frequency range, and receiver 24 is preferably tuned to a frequency $f_2$ to capture another portion of the original signal $X(t)$ in another selected frequency range. Together, receivers 22, 24 preferably capture the entire bandwidth of the original signal $X(t)$. To illustrate the invention more clearly, suppose that $X(t)$ is the signal shown in FIG. 2a having a center frequency $f_c$ and a frequency band ranging from $f_0$ to $f_z$. Suppose further that receiver 22 is tuned to frequency $f_1$ and has a receiving bandwidth ranging from frequency $f_{1b}$ to $f_{1e}$, and that receiver 24 is tuned to frequency $f_2$ and has a receiving bandwidth ranging from frequency $f_{2b}$ to $f_{2e}$. As shown in FIG. 2a, the two receivers 22, 24 together capture the entire bandwidth of signal X(t). Notice that the two receivers 22, 24 overlap in frequency between $f_{2b}$ and $f_{1e}$. For the present invention, this frequency overlap need not be a careful and precise overlap but may instead vary without adversely affecting the operation of system 20. The portions of the original signal X(t) captured by receivers 22 and 24 are shown in FIGS. 2b and 2c, respectively. To facilitate reference thereto, the portion of signal X(t) captured by receiver 22 will be referred to herein as $S_1(t)$ and the portion captured by receiver 24 will be referred to as $S_2(t)$. $S_1(t)$ and $S_2(t)$ can be regarded as "complex" waveforms in that each receiver is assumed to have produced both an "in-phase" and "quadrature" waveform.

It should be noted here that the signal representations depicted in FIGS. 2b and 2c are based on the assumption that the signal X(t) arrives at the receivers 22, 24 simultaneously. As noted above, however, this assumption may not always be true. Where the signal X(t) arrives at the receivers 22, 24 at different times, a relative time delay will be introduced between the signal portions $S_1(t)$ and $S_2(t)$. The present invention can tolerate such a time delay as long as it is not too large. This issue will be discussed in greater detail in a later section.

Referring again to FIG. 1, after the signal portions $S_1(t)$, $S_2(t)$ are captured, they are passed on to the A/D converters 26, 28 to be converted into digital signals. This conversion is preferably achieved by sampling the signal portions $S_1(t)$, $S_2(t)$ at regular time intervals ($\Delta t$). As used herein, a digital signal represents a stream of discrete values. These discrete values may be sample values of a continuous signal representing values of the continuous signal taken at specific points in time. The outputs $s_1(k)$, $s_2(k)$ of converters 26, 28 represent the complex digital versions of signal portions $S_1(t)$ and $S_2(t)$. Specifically, digital signal $s_1(k)$ is the complex digital version of signal $S_1(t)$ having a center frequency of $f_1$, and digital signal $s_2(k)$ is the complex digital version of signal $S_2(t)$ having a center frequency of $f_2$. It is these digital signals $s_1(k)$, $s_2(k)$ which are processed to form a reconstructed representation of the original signal X(t).

The processing of digital signals $s_1(k)$, $s_2(k)$ begins with shifting the frequencies of the signals $s_1(k)$, $s_2(k)$ relative to one another. This step overlays the frequency bands of the signals in such a way as to allow the signals to be subsequently combined to reconstruct the original signal X(t). To illustrate this point more clearly, reference is made to FIGS. 2a–2c and FIG. 3. These figures depict the continuous signal portions $S_1(t)$, $S_2(t)$ instead of the digital signals $s_1(k)$, $s_2(k)$; however, the same reasoning applies to both types of signals. As shown in FIGS. 2b and 2c, each receiver 22, 24 captures a portion of the original signal in a particular frequency range. If the captured signal portions are simply combined with each other without frequency shifting, the situation shown in FIG. 3 would result. Specifically, the signals would simply be laid one on top of the other and added to form a signal which bears little resemblance to the original signal shown in FIG. 2a. In order to properly reconstruct signal X(t), signal portion $S_2(t)$ should be shifted up in frequency relative to signal portion $S_1(t)$, or signal portion $S_1(t)$ should be shifted down in frequency relative to signal portion $S_2(t)$, or both. The net relative shift in frequency preferably is equal to the difference in center frequencies of the two receivers 22, 24. That is, after frequency shifting, the signal portions $S_1(t)$, $S_2(t)$ are preferably separated by a frequency difference equal to $f_2-f_1$. Introducing a relative frequency shift in this manner helps to ensure that the signal portions are properly overlaid in frequency so that they can be properly combined to reconstruct the original signal. The frequency shifters 30, 32 shown in FIG. 1 perform this shifting function on the digital signals $s_1(k)$, $s_2(k)$. While this frequency shift may be achieved by shifting only one of the signals $s_1(k)$, $s_2(k)$, it is preferable that both signals be shifted to place the combined signal at a suitable intermediate frequency for further processing. The resulting net frequency shift is preferably equal to $f_2-f_1$.

Once the digital signals $s_1(k)$, $s_2(k)$ have been properly frequency shifted, they are each passed through a low pass filter (LPF) and resampler 34, 36. These components serve to filter out any noise introduced into the signals $s_1(k)$, $s_2(k)$, and to resample the signals $s_1(k)$, $s_2(k)$ at an appropriate rate to prepare them for processing through the adaptive filters 38 and 40. Components 34, 36 preferably take the form of antialiasing filters. Such filters prevent the phenomenon of "aliasing" (caused by undersampling) from occurring.

System 20 preferably further comprises two adaptive filters 38 and 40, summer 42, and error determiner 44. The filters 38, 40 serve to remove distortion injected into the signals $s_1(k)$, $s_2(k)$ by the receivers or the communications channels, and to process the signals in the proper manner to allow the original signal X(t) to be reconstructed. In particular, filter 38, having a first set of parameters, receives signal $s_1(k)$ as input and provides as output a first filtered signal, while filter 40, having a second set of parameters, receives signal $s_2(k)$ as input and provides a second filtered signal as output. The first and second filtered signals from filters 38, 40 are combined by summer 42 to derive the primary output signal y(k) which is a reconstructed digital representation of the original signal X(t). Notice that in the system 20 of FIG. 1, the digital signals $s_1(k)$, $s_2(k)$ are first filtered and then combined. This is in sharp contrast to the prior art method wherein the signals were first combined and then filtered. Processing the signals $s_1(k)$, $s_2(k)$ in accordance with the present invention allows variable frequency overlaps, relative time delays, and some degree of frequency offset to be tolerated. Thus, the present invention is much more versatile and robust than that of the prior art.

Once the primary output signal y(k) is derived, it is passed on to error determiner 44, where an error component associated with the output signal y(k) is determined. Using this error component, the parameters of the filters 38, 40 are preferably separately adjusted in such a way as to reduce the error component. In this manner, filters 38 and 40 are continually updated to ensure that they provide accurate filtered signals for use in reconstructing the original signal.

FIG. 1 is a functional representation of the first embodiment of the present invention. In actual implementation, frequency shifters 30, 32, filters 38, 40, summer 42, and error determiner 44 are preferably implemented by way of a digital computer and shift registers. To elaborate, the frequency shifters 30, 32 are preferably implemented by way of a computer program module executed by a computer. The frequency shifts on the signals $s_1(k)$, $s_2(k)$ are achieved by heterodyning the complex signals $s_1(k)$, $s_2(k)$ with complex sinusoids. That is, the sample values of the signals $s_1(k)$, $s_2(k)$ are mathematically manipulated using complex sinusoids to shift the effective frequencies of the signals. The sinusoids used in the heterodyning process preferably differ in frequency by the amount $f_2-f_1$ so that a relative frequency shift of $f_2-f_1$ can be introduced between the signals $s_1(k)$, $s_2(k)$.

The filters 38, 40 of system 20 are preferably implemented by way of shift registers and computer program modules executed by a computer. More specifically, filters 38 and 40 preferably take the form of "transversal" filters. To describe the filters 38, 40 more clearly, a functional diagram of filter 38 is provided in FIG. 4, wherein the filter 38 comprises a shift register 50 having a plurality of stages 50$_1$–50$_z$. Each stage of shift register 50 temporarily stores a single sample value of the input digital signal s$_1$(k). Sample values enter the register 50 at stage 50$_1$ and, during subsequent time intervals, are shifted through the various stages 50$_1$–50$_z$ until they are finally shifted out of the register 50 and discarded. Associated with each stage of the shift register 50 is a multiplying coefficient or "tap weight" W$_{1,n}$(k)–W$_{1,n}$(k). These tap weights are preferably maintained by a computer under the direction of a program module, and are multiplied with the sample values stored within corresponding register stages to alter or shape the sample values. It is these tap weights which are responsible for filtering the input digital signal to obtain a desired output signal. In the preferred embodiment, the tap weights are freely and continually altered by the computer to adjust for varying amounts of distortion and other factors. The results obtained from multiplying the tap weights and the stored sample values are summed, preferably by the computer, to derive the first filtered signal shown in FIGS. 1 and 4.

The filter 40 is structured and operates in much the same manner as filter 38. With reference to FIG. 5, filter 40 preferably comprises a shift register 60 having a plurality of stages 60$_1$–60$_z$, with each stage temporarily storing a sample value of the input signal s$_2$(k). Associated with each stage is a complex tap weight W$_{2,m}$(k)–W$_{2,m}$(k) which is multiplied with the sample value stored in the associated stage. The results of the multiplication are thereafter summed to provide the second filtered signal. As with filter 38, the maintenance of the tap weights and the multiplication and summation operations in filter 40 are preferably carried out by a computer under the direction of a program module. Also like filter 38, the tap weights W$_{2,m}$(k)–W$_{2,m}$(k) are freely and continually updated.

With regard to summer 42 and error determiner 44, these are likewise preferably computer implemented. Specifically, summer 42 preferably is a program module which receives as inputs the first and second filtered signals, and sums these signals together to provide the primary output signal y(k). Similarly, error determiner 44 is preferably a program module which receives the primary output signal y(k) and computes, based on the signal y(k), an error component. This error component is subsequently used by a computer to separately update the parameters or tap weights of the filters 38, 40 so as to reduce the error component.

In determining the error component associated with the primary output signal y(k), a number of different error criterion algorithms may be used. For the sake of example, the Constant Modulus Algorithm (CMA) will be discussed but it should be noted that other algorithms may be used as well. Likewise, in updating the tap weights of the filters 38, 40, several different methods may be utilized. In the present invention, the steepest descent (gradient) algorithm is preferred. With this background information in mind, the equations for updating the tap weights of filters 38 and 40 will now be derived.

As shown in FIG. 1, the primary output signal y(k) is obtained by combining the first and second filtered signals. These filtered signals are in turn derived by summing the results of multiplying the tap weights of each filter 38, 40 with corresponding sample values stored in the stages of the shift registers 50, 60. Thus, the primary output signal may be expressed as follows:

$$y(k) = \sum_{i=-n}^{n} W_{1,i} s_1(k-i) + \sum_{i=-m}^{m} W_{2,i} s_2(k-i)$$

where W$_{1,i}$ and W$_{2,i}$ represent the complex tap weights of the filters 38 and 40, respectively, and s$_1$ and s$_2$ represent the sample values stored in the various stages of the shift registers 50 and 60, respectively, as shown in FIGS. 4 and 5. According to the CMA, the error function at time k is $E^2(k)=(|y(k)|^2-1)^2$, assuming that the analog signal portions S$^1$(t) and S$_2$(t) have been appropriately normalized. With the error function determined, the update equations can be derived. According to the gradient method, the tap weights of each filter 38, 40 may be updated at time k+1 according to the following equations:

$$W_1(k+1) = W_1(k) - \eta_1 \nabla_{w1}(k)$$

and $$W_2(k+1) = W_2(k) - \mu_2 \nabla_{x2}(k)$$

where W$_1$ represents the set of complex tap weights of filter 38, W$_2$ represents the set of complex tap weights of filter 40, $\nabla_{w1}(k)$ and $\nabla_{w2}(k)$ are the gradients of E with respect to W$_1$ and W$_2$, respectively, at time k, and $\mu_1$, $\mu_2$ are the adaptation gains. The gradients $\nabla_{w1}(k)$ and $\nabla_{w2}(k)$ are given by:

$$\nabla_{w1}(k) = E(k) y(k) s_1^*(k)$$

and $$\nabla_{w2}(k) = E(k) y(k) s_2^*(k)$$

where s$_1$ represents the set of sample values stored in shift register 50, s$_2$ represents the set of sample values stored in shift register 60, and "*" denotes "complex conjugate". Thus, from the above equations, the tap update equations may be expressed as follows:

$$w_1(k+1) = w_1(k) - \mu_1 E(k) y(k) s_1^*(k)$$

and $$w_2(k+1) = w_2(k) - \mu_2 E(k) y(k) s_2^*(k)$$

Using the above equations, the tap weights of filters 38 and 40 may be continually and separately updated in order to adapt to varying conditions. Because filters 38 and 40 are able to use feedback (i.e. the error component) to adapt to changing conditions, they are referred to as adaptive filters. In the preferred embodiment, the equations shown above are implemented in a program module which is executed by a computer to control the operation of the filters 38, 40.

Referring now to FIG. 6, which provides a flow diagram of the signal reconstruction process, the overall operation of the system 20 of FIG. 1 will now be described. To begin operation, an original signal is first received 70 by a plurality of receivers 22, 24, with each receiver capturing a portion of the original signal in a selected frequency range. Together, the receivers 22, 24 capture the entire original signal. At this point, the original signal becomes a multichannel signal. Once captured, the various signal portions S$_1$(t), S$_2$(t) are converted 72 by A/D converters 26, 28 into digital signals s$_1$(k), s$_2$(k) which may be processed by a computer. These digital signals are received 74 by frequency shifters 30, 32 and shifted 76 in frequency relative to each other to achieve a frequency difference equal to the difference in center frequencies (f$_2$–f$_1$) of the receivers 22, 24. This helps to ensure that the digital signals s$_1$(k), s$_2$(k) are properly frequency overlaid to facilitate an accurate reconstruction of the original signal X(t). Thereafter, each digital signal is processed 80 through an adaptive filter 38, 40 to prepare the signal for combination. It is during this step that distortion is removed, and signal conditioning is performed to fine-tune the digital signals. Thereafter, the outputs of filters 38, 40 are combined 82 to derive the primary output signal y(k), which is a digital reconstruction of the original signal X(t). This output signal y(k) is passed on to error determiner 44 where an error component is determined 84. Using this error component, and using the equations derived above, the parameters or tap weights of the filters 38, 40 are adjusted 86 to reduce the error component. These steps 70–86 are repeated to reconstruct an original signal received over a period of time.

Thus far, the invention has been described with respect to only two receivers. It should be noted, however, that the principles taught herein may be generalized to any number of receivers. A generalized diagram of the first preferred embodiment is provided in FIG. 7, wherein the system is shown as having an arbitrary number N of receivers. Each receiver receives a portion of the signal X(t) in a selected frequency range, and all of the receivers together capture the entire bandwidth of the signal X(t). For each additional receiver used, a corresponding A/D converter, frequency shifter, LPF and resampler, and filter are preferably added to the system. Extension of the invention to more than two receivers is relatively straightforward.

For the system 20 shown in FIG. 1, computer simulation tests were conducted for input signals which were modulated using quadriphase shift keying (QPSK) and for input signals modulated using quadrature amplitude modulated (QAM) signals with a 4×4 signal constellation (16-QAM). System 20 performed well. When there was no frequency offset between the receivers 22, 24, system 20 was able to successfully reconstruct the original signal X(t) despite the fact that a relative time delay was imposed between the signal portions $S_1(t)$ and $S_2(t)$. Relative time delays larger than a symbol were tolerated. System 20 was also able to tolerate variances in frequency overlap between the receivers 22, 24. With regard to frequency offset, system 20 was able to tolerate only small offsets (much less than 0.01% of the symbol rate). Offsets greater than or equal to 0.01% caused the system to not converge. System 20 proved to be much more robust than the prior art multichannel reconstruction mechanisms.

The system 20 of FIG. 1 performs adequately in many applications, but because it utilizes transversal filters, it does not converge as quickly as might be required in some applications. For those applications which require faster convergence, lattice filters (which converge more quickly) are preferably used. Implementing lattice filters in the present invention is not a simple matter of substituting lattice filters for transversal filters, however. This is because in order for lattice filters to achieve faster convergence, the values propagating through the different lattices should be "orthogonal", i.e. the expected values of the cross-correlations between the outputs of the lattice filters should be 0. Where lattice filters are applied directly to input signals in multiple channels, this may not necessarily be the case. Thus, a different approach is needed.

With reference to FIG. 8, there is shown a functional block diagram of a second preferred embodiment 100 of the present invention in which a lattice filter 122 is successfully incorporated to provide for faster convergence. System 100 of FIG. 8 is similar to system 20 in many respects. Like system 20, system 100 has two receivers 102, 104 for receiving the original signal X(t). Receiver 102 is tuned to frequency $f_1$ to receive a portion of signal X(t) in a selected frequency range, and receiver 104 is tuned to frequency $f_2$ to receive another portion of signal X(t) in another selected frequency range. Both receivers together preferably capture the entire bandwidth of signal X(t). Once the signal portions $S_1(t)$ and $S_2(t)$ are captured, they are processed through A/D converters 106, 108 to convert them into digital signals $s_1(k)$ and $s_2(k)$. The digital signals $s_1(k)$, $s_2(k)$ are then frequency shifted relative to one another by frequency shifters 110, 112 so that they are properly overlaid in frequency to facilitate their subsequent combination. The amount of frequency shift is preferably equal to $f_2-f_1$. All of the elements 102–112 of system 100 described thus far are identical to the corresponding elements 22–32 in system 20.

The systems 20 and 100 begin to diverge both in structure and in function after the digital signals $s_1(k)$, $s_2(k)$ have been frequency shifted. Specifically, instead of filtering both signals $s_1(k)$, $s_2(k)$ first and then combining them as was done in system 20, system 100 initially processes only one of the signals $s_2(k)$ through a filter 114 to derive a filtered signal, and then combines the filtered signal with the other unfiltered digital signal $s_1(k)$ to form an intermediate output signal as shown in FIG. 8. This intermediate output signal is thereafter processed through a LPF and resampler 118 (which preferably takes the form of an antialiasing filter) and a second filter 120 to derive the primary output signal y(k), which is a digital reconstruction of the original signal X(t). The second filter 120 preferably comprises a lattice filter 122 to provide for faster convergence. Because of the manner in which lattice filter 122 is implemented in the system 100, orthogonality is assured; thus, faster convergence can be achieved by the filter 122. Once the primary output signal y(k) is derived, the error determiner 126 determines an error component associated with the signal y(k). This error component is thereafter used to adjust the parameters of the filters 114, 120 to reduce the error component. Thus, filters 114 and 120 are continually adjusted in order to adapt to changing conditions.

In actual implementation, filters 114, 120, summer 116, and error determiner 126 are preferably implemented by way of shift registers and a digital computer. The operation of the computer is preferably controlled by a program module. With regard to filter 114, this filter preferably takes the form of a transversal filter similar to those described above in connection with filters 38 and 40. A functional block diagram of filter 114 is shown in FIG. 9, wherein the filter 114 is shown as comprising a shift register 130 having a plurality of stages $130_1$–$130_z$. Each stage temporarily stores one of the values of the input digital signal $s_2(k)$, and with the passing of each time interval At, the contents of each stage is shifted one stage to the right. New values are thus shifted in and old values are thus shifted out. Associated with each stage is a tap weight $W_{2,n}(k)$–$W_{2,n}(k)$ which is maintained by the computer and which is used to multiply against the value stored in the register stage. These tap weights serve to remove distortion and to fine-tune the signal values. It should be noted that the tap weights may be freely modified by the computer; thus, filter 114 can dynamically adapt to varying conditions. After the tap weights are multiplied with the stored values, the results of the multiplication process are summed to derive the filtered signal as shown in FIGS. 8 and 9.

The structure of filter 120 is more complex. With reference to FIG. 10, which provides a detailed functional diagram of filter 120, filter 120 preferably comprises a lattice filter 122 and an adaptive filter 124. The lattice filter 122 preferably comprises a register having a plurality of stages $140_1$–$140_n$, and a plurality of summers 142. Lattice filter 122 receives as input the intermediate output signal and provides as output a plurality of parallel output values $b_1(k)$–$b_n(k)$ which are orthogonal to each other. By orthogonal, it is meant that the dot product of any two output values taken over time will be equal to 0. This orthogonality is important because it gives rise to the filter's 120 ability to converge quickly. Notice that within the lattice filter, there are a plurality of coefficients $K_1$–$K_n$ and their complex conjugates $K_1^*$–$K_n^*$ which are used to modify values before the values are passed on to the summers 142. These coefficients are preferably maintained and updated by a computer under the control of a program module to ensure that the parallel output values $b_1(k)$–$b_n(k)$ remain orthogonal. The operation of a lattice filter is described in detail in "A Lattice-Based Constant Modulus Adaptive Filter" by R. Gooch, M. Ready, and J. Svoboda, *Proceedings, Twentieth Asilomar Conference on Circuits, Systems, & Computers*, November 1986. This reference is hereby incorporated herein.

As mentioned above, lattice filter 122 releases the output values $b_1(k)$–$b_n(k)$ in parallel. Accordingly, adaptive filter 124 receives and processes these output values $b_1(k)$–$b_n(k)$ in parallel. In adaptive filter 124, there is a tap weight $W_{1,1}(k)$–$W_{1,n}(k)$ associated with each lattice filter output value. Each of these tap weights is preferably maintained and updated by a computer under the control of a program module, and is multiplied with a corresponding lattice output value to condition the output values $b_1(k)$–$b_n(k)$. The results of the multiplication process are then combined by summer 146 to derive the primary output signal $y(k)$, which represents a digital reconstruction of the original signal $X(t)$. The original signal $X(t)$ is thus reconstructed.

Once $y(k)$ is derived, it is passed on to error determiner 126 where an error component is determined. Using this error component, the tap weights of filters 114 and 124 are adjusted in such a manner as to reduce the error component. In system 100, different algorithms are used for updating the tap weights of filters 114 and 124. For filter 114, the CMA is used. For filter 124, the Recursive Least Squares Algorithm is used.

For filter 124, the tap update equation is:

$$W_1(k+1) = W_1(k) - \mu_1 R^{-1} E(k) y(k) b^*(k)$$

where $W_1$ represents the set of complex tap weights of filter 124, $b(k)$ denotes the vector of output values of lattice filter 122, $R$ denotes the autocorrelation matrix of $b(k)$, $\mu_1$ is the adaptation gain, and "*" denotes complex conjugate.

For filter 114, the tap update equation is:

$$W_2(k+1) = W_2(k) - \mu_2 \nabla_{w2}(k)$$

where $W_2$ represents the set of complex tap weights of filter 114, $\nabla_{w2}(k)$ is the gradient of E with respect to $W_2$, at time $k$, and $\mu_2$ is the adaptation gain. The gradient vector $\nabla_{w2}(k)$ consists of the partial derivatives of the real and imaginary parts of $W_2$ ($\partial E^2/\partial Re(W_2)$, $\partial E^2/\partial Im(W_2)$). These quantities are given by:

$$\partial E^2/\partial Re(W_2) = 4[Re(y(k))Re(W_1^T(k)s_2(k)) - Im(y(k))Im(W_1^T(k)s_2(k))] E(k)$$

and $$\partial E^2/\partial Im(W_2) = 4[Re(y(k))Im(W_1^T(k)s_2(k)) - Im(y(k))Re(W_1^T(k)s_2(k))] E(k)$$

where $s_2(k)$ represents the vector of values stored in shift register 130 of filter 114, and the superscript "T" denotes "transpose." Since the constant "4" can be absorbed into the adaptation gains, it can be ignored. Thus, from the above equations, the gradient vector $\nabla_{w2}(k)$ is given by:

$$\nabla_{w2}(k) = E(k) y(k) W_1^{T*}(k) s_2^*(k)$$

Hence, the tap update equation for $W_2$ is:

$$W_2(k+1) = \mu_2 E(k) y(k) W_1^{T*}(k) s_2^*(k)$$

These tap update equations are preferably implemented by a computer under the control of a program module to continually update the tap weights of the filters 114, 124 so that the filters can adapt to changing conditions.

Referring now to FIG. 11, which provides a flow diagram of the signal reconstruction process of system 100, the overall operation of system 100 will be described. To begin operation, an original signal is first received 160 by a plurality of receivers 102, 104, with each receiver capturing a portion of the original signal in a selected frequency range. Together, the receivers 102, 104 capture the entire original signal. Once captured, the various signal portions $S_1(t)$, $S_2(t)$ are converted 162 by A/D converters 106, 108 into digital signals $s_1(k)$, $s_2(k)$ which may be processed by a computer. These digital signals are received 164 by frequency shifters 110, 112 and shifted 166 in frequency relative to each other to achieve a frequency difference equal to the difference in center frequencies ($f_2 - f_1$) of the receivers 102, 104. This helps to ensure that the digital signals $s_1(k)$, $s_2(k)$ are properly frequency overlaid to facilitate an accurate reconstruction of the original signal $X(t)$. Thereafter, the second digital signal $s_2(k)$ is filtered 168 by adaptive filter 114 to derive a filtered signal. This filtered signal is then combined 170 with digital signal $s_1(k)$ to derive an intermediate output signal, which is filtered and resampled 172 by antialiasing filter 118. Thereafter, the intermediate output signal is processed 174 through filter 120 to derive the primary output signal $y(k)$, which is a digital reconstruction of the original signal $X(t)$. Step 174 is preferably performed by first processing the intermediate signal through lattice filter 122 to derive a set of parallel orthogonal filtered values, and then processing the filtered values in parallel through adaptive filter 124 to derive $y(k)$. Once primary output signal $y(k)$ is derive, it is passed on to error determiner 126 where an error component is determined 176. Using this error component, and using the equations derived above, the parameters or tap weights of the filters 114, 124 are adjusted 178 to reduce the error component. These steps 160–178 are repeated to reconstruct an original signal received over a period of time.

Thus far, the second embodiment of the present invention has been described with respect to only two receivers. It should be noted, however, that the principles underlying system 100 may be generalized to any number of receivers. A generalized diagram of the second preferred embodiment is provided in FIG. 12, wherein the system is shown as having an arbitrary number N of receivers $200_1$–$200_n$. Each receiver receives a portion of the signal $X(t)$ in a selected frequency range, and all of the receivers $200_1$–$200_n$ together capture the entire bandwidth of the signal $X(t)$. For each additional receiver used, a corresponding A/D converter $210_1$–$210_n$, frequency shifter $220_1$–$220_n$, and filter $230_1$–$230_n$ are preferably added to the system. Notice that regardless of the number of receivers used, only one adaptive lattice 260 filter is needed. Consequently, system complexity is kept to a minimum. Extension of the invention to more than two receivers is relatively straightforward.

For the system 100 shown in FIG. 8, computer simulation tests were conducted for input signals that were modulated using quadriphase shift keying (QPSK) and for signals modulated using quadrature amplitude modulated (QAM) signals with a 4×4 signal constellation (16-QAM). System 100 performed quite well. With no frequency offset between the receivers 102, 104, system 100 was able to successfully reconstruct the original signal even when a relative time delay was imposed between the signal portions $S_1(t)$, $S_2(t)$. Delays larger than a symbol were tolerated. System 100 was also able to tolerate variances in frequency overlap between the receivers 102, 104. In the case where the modulation was 16-QAM, the relative time delay was two symbols, and the frequency offset was 0.01% of the baud rate, system 100 was still able to successfully reconstruct the original signal. Because of the faster convergence provided for by the lattice filter 122, system 100 was able to converge quickly enough to track the frequency offset. Thus, the system 100 of FIG. 8 is even more robust than system 20 of FIG. 1. However, the implementation of system 100 is more complex. Thus, which embodiment is used in any particular application depends upon the requirements of the application.

While the present invention has been described with reference to specific embodiments and specific implementations, it should be noted that the invention is not so limited. Many modifications may be made by one of ordinary skill in the art with the benefit of this disclosure without departing from the scope and spirit of the invention. For instance, the invention has been described only with respect to reconstructing multichannel signals. It should be noted, however, that the invention may be used in various other applications such as beamforming, null-steering, direction-finding, and other signal processing applications. These and other modifications are within the spirit of the invention. Thus, the invention should not be limited by the specific embodiments used to describe it but only by the scope of the appended claims.

What is claimed is:

1. A method for deriving a primary output signal from a plurality of secondary signals, comprising the steps of:
   receiving a first input signal and a second input signal;
   processing said second input signal through a first filter having a first set of parameters to derive a filtered signal:
   combining said filtered signal with said first input signal to derive an intermediate output signal; and
   processing said intermediate output signal through a second filter having a second set of parameters to derive said primary output signal;
   wherein the step of processing said intermediate output signal comprises the sub-steps of:
      deriving a set of parallel filtered values from said intermediate output signal, said set of parallel filtered values being orthogonal relative to each other; and
      processing said set of parallel filtered values in parallel to derive said primary output signal.

2. The method of claim 1, further comprising the steps of:
   determining an error component using said primary output signal; and
   adjusting said first and second sets of parameters to reduce said error component.

3. The method of claim 1, wherein one of said input signals is time-delayed relative to the other input signal.

4. The method of claim 1, further comprising the step of:
   prior to processing said second input signal, shifting at least one of said input signals in frequency relative to the other to introduce a selected frequency difference between said input signals.

5. A method for deriving a primary output signal from a plurality of secondary signals, comprising the steps of:
   receiving a first input signal and a second input signal;
   processing said second input signal through a first filter having a first set of parameters to derive a filtered signal;
   combining said filtered signal with said first input signal to derive an intermediate output: signal; and
   processing said intermediate output signal through a second filter having a second set of parameters to derive said primary output signal:
   wherein the step of processing said intermediate output signal comprises the sub-steps of:
      processing said intermediate output signal through a lattice filter to derive a set of parallel filtered values, said set of parallel filtered values being orthogonal relative to each other: and
      processing said set of parallel filtered values in parallel through an adaptive filter to derive said primary output signal.

6. The method of claim 5, further comprising the steps of:
   determining an error component using said primary output signal; and
   adjusting said first and second sets of parameters to reduce said error component.

7. The method of claim 5, wherein one of said input signals is time-delayed relative to the other input signal.

8. The method of claim 5, further comprising the step of:
   prior to processing said second input signal, shifting at least one of said input signals in frequency relative to the other to introduce a selected frequency difference between said input signals.

9. A signal processing system, comprising:
   a first filter having a first set of parameters, for processing a first input signal to provide a filtered signal;
   a signal combiner for combining said filtered signal and a second input signal to derive an intermediate output signal; and
   a second filter having a second set of parameters, for processing said intermediate output signal to derive a primary output signal;
   wherein said second filter comprises:
      a lattice filter for processing said intermediate output signal to derive a set of parallel filtered values, said set of parallel filtered values being orthogonal relative to each other; and
      an adaptive filter, having said second set of parameters, for processing said parallel filtered values in parallel to derive said primary output signal.

10. The system of claim 9, wherein said first filter is a transversal filter.

11. The system of claim 9, further comprising:
    an error determiner for determining an error component based on said primary output signal; and
    means for adjusting said first and second sets of parameters to reduce said error component.

12. The system of claim 9, further comprising:
    a first receiver for receiving a portion of an original signal, and outputting a first signal portion;
    a second receiver for receiving another portion of said original signal, and outputting a second signal portion;
    a first converter for converting said first signal portion into said first input signal; and
    a second converter for converting said second signal portion into said second input signal.

13. A signal processing system, comprising:

a frequency shifting mechanism, said mechanism receiving first and second input signals, and shifting at least one of said input signals in frequency relative to the other input signal to introduce a selected frequency difference between said input signals, said mechanism providing first and second output signals;

a first filter, having a first set of parameters, for processing said first output signal to provide a filtered signal;

a signal combiner for combining said filtered signal and said second output signal to derive an intermediate output signal; and a second filter, having a second set of parameters, for processing said intermediate output signal to derive a primary output signal;

wherein said second filter comprises:
- a lattice filter for processing said intermediate output signal to derive a set of parallel filtered values, said set of parallel filtered values being orthogonal relative to each other: and
- an adaptive filter, having said second set of parameters, for processing said parallel filtered values in parallel to derive said primary output signal.

14. The system of claim 13, wherein said first filter is a transversal filter.

15. The system of claim 13, further comprising:

an error determiner for determining an error component based on said primary output signal; and means for adjusting said first and second sets of parameters to reduce said error component.

16. The system of claim 13, further comprising:

a first receiver for receiving a portion of an original signal, and outputting a first signal portion;

a second receiver for receiving another portion of said original signal, and outputting a second signal portion;

a first converter for converting said first signal portion into said first input signal; and a second converter for converting said second signal portion into said second input signal.

* * * * *